United States Patent [19]
Kurano et al.

[11] Patent Number: 5,632,833
[45] Date of Patent: May 27, 1997

[54] METHOD OF MANUFACTURING LAMINATED CERAMIC CAPACITOR

[75] Inventors: Masayuki Kurano; Masato Shirakata, both of Tokyo, Japan

[73] Assignee: NEC Corporation, Tokyo, Japan

[21] Appl. No.: 326,376

[22] Filed: Oct. 20, 1994

[30] Foreign Application Priority Data

Oct. 29, 1993 [JP] Japan ................... 5-271112

[51] Int. Cl.$^6$ ............... B32B 31/12; B32B 31/26
[52] U.S. Cl. ............ 427/125; 361/305; 361/321.3; 361/321.4; 156/89
[58] Field of Search ................ 156/89; 264/61; 427/58, 125, 123, 126.1, 126.5; 361/305, 321.3, 321.4, 321.5; 501/134; 148/240, 284; 252/514, 520, 518

[56] References Cited

U.S. PATENT DOCUMENTS

| | | |
|---|---|---|
| 3,718,551 | 2/1973 | Martinsons . |
| 3,852,074 | 12/1974 | Rosenberg . |
| 4,668,299 | 5/1987 | Nanao et al. . |
| 4,755,493 | 7/1988 | Takeuchi et al. ................ 501/134 |
| 4,757,235 | 7/1988 | Nunomura et al. . |
| 5,001,598 | 3/1991 | Constantine ................ 361/305 |
| 5,162,062 | 11/1992 | Carroll et al. . |
| 5,288,430 | 2/1994 | Amemiya ................ 252/514 X |
| 5,348,805 | 9/1994 | Zagdoun et al. . |
| 5,378,408 | 1/1995 | Carroll et al. ................ 252/514 |

FOREIGN PATENT DOCUMENTS

| | | |
|---|---|---|
| 63-115691 | 5/1988 | Japan . |
| 63-283184 | 11/1988 | Japan . |

*Primary Examiner*—David A. Simmons
*Assistant Examiner*—M. Curtis Mayes
*Attorney, Agent, or Firm*—Sughrue, Mion, Zinn, Macpeak & Seas

[57] ABSTRACT

The invention provides a method of manufacturing a laminated ceramic capacitor, which method includes a step of forming an electrically conductive paste layer on a green sheet composed of lead system composite perovskite oxide. The paste includes a solvent in which are distributed metal powder including at least silver powder, organic titanium compound, organic rhodium compound and organic binder. An amount of titanium in the paste preferably is in the range of 0.02% to 0.09% by weight on the basis of a weight of the metal powder, and an amount of rhodium in the paste preferably is in the range of 0.10% to 0.60% by weight on the basis of a weight of the metal powder.

9 Claims, 2 Drawing Sheets

METHOD OF MANUFACTURING LAMINATED CERAMIC CAPACITOR

BACKGROUND OF THE INVENTION

1. Field of the Invention

The invention relates to a method of manufacturing a laminated ceramic capacitor, and more particularly to a method of manufacturing such a capacitor using an electrically conductive paste used for the formation of an internal electrode of a laminated ceramic capacitor which uses lead system composite perovskite oxide as a dielectric substance.

2. Description of the Related Art

The laminated ceramic capacitor as aforementioned is manufactured generally in the following steps. First, lead system composite perovskite oxide powder as a ceramic dielectric substance powder is mixed with an organic binder and a solvent, and then the mixture is formed into a sheet by means of a casting process. Then, on the green sheet are formed electrically conductive paste layers which are to work as internal electrodes, by means of a screen printing process. After a certain number of the layers have been deposited, they are compressed to bond with each other. Then, the thus laminated layers is cut into individual capacitors. Then, the individual capacitors are fired so that a ceramic dielectric substance and metal powder in the paste are simultaneously sintered. Finally, an external electrode is formed.

In the above-described process, a step of simultaneously firing the dielectric ceramic in the form of a sheet and the metal powder in the electrically conductive paste to be sintered is indispensable to a method of manufacturing a laminated ceramic capacitor.

A laminated ceramic capacitor can have desired properties by forming ceramic dielectrics and internal electrodes closely integral with each other by means of the above mentioned firing step. Accordingly, it is quite important, in the firing step to avoid so-called "delamination of layers", which means a phenomenon wherein a ceramic dielectric is peeled off from an internal electrode in a laminated structure after the firing step, in order to obtain a capacitor having stable and reliable. The delamination of layers occurs when a stress acting on an interface of the metal (internal electrode) and the ceramic (dielectric substance) is greater than a bonding strength between them. In view of this point, the following are considered to be problems frequency found in a firing step.

1. A ceramic can have only a weak bonding strength with a metal, and hence it is impossible to strongly bond a ceramic to a metal.

2. Since there is a difference in a volume shrinkage due to firing between a ceramic and a metal, a stress would be generated at an interface of them particularly when the temperature is being raised in a firing step.

3. Because of a great difference in a thermal expansion coefficient between a ceramic and a metal, a volume expansion and shrinkage due to an increase or decrease in temperature during firing would entail a large stress.

Thus, in order to avoid delamination of layers between internal electrodes and dielectric substances in a laminated ceramic capacitor, an electrically conductive paste used for an internal electrode is required to have a great bonding strength with a ceramic dielectric and to generate a small stress.

A conventional electrically conductive paste used for a laminated ceramic capacitor is a mixture of metal powder including at least silver powder such as a mixture of silver powder and palladium powder, and a vehicle comprising an organic binder and a solvent. The mixture is well mixed by means of three rolls, and then used as the paste.

As aforementioned, in a conventional method of manufacturing a laminated ceramic capacitor, an electrically conductive paste including the mixture of metal powder including silver powder and a vehicle comprising an organic binder and a solvent has been used for formation of internal electrodes. However, an electrically conductive paste is required to have a characteristic by which a greater bonding strength would be generated between an internal electrode and a ceramic dielectric substance, and also by which a smaller stress would occur at an interface between an internal electrode and a ceramic dielectric substance, in order to enhance the stability and reliability of revelation of the capacitor characteristic.

In view of such a demand, there has not been suggested an electrically conductive paste manufactured only for a laminated ceramic capacitor. However, it is possible to solve the problems of the weakness of a bonding strength and the largeness of a stress by using an electrically conductive paste modified for another objects.

For instance, Japanese Unexamined Patent Public Disclosure No. 63-115691 discloses an electrically conductive paste having an improved bonding strength with a non-oxide ceramic such as AlN. In this Disclosure, an organic titanium family adhesion promotion agent or a titanate coupling agent is added to a conventional active silver solder paste, and hydrolysis of the titanate coupling agent with water absorbed in a surface of a ceramic substrate is used to improve the bonding strength. Though the electrically conductive paste aims to strengthen a bonding strength between high thermally conductive ceramic veneers or between such a ceramic veneer and a metal, the electrically conductive paste can be used as an internal electrode to thereby obtain a greater bonding strength between an internal electrode and a ceramic dielectric substance than that obtained by a lo conventional electrically conductive paste.

Japanese Unexamined Patent Public Disclosure No. 63-283184 has suggested an electrically conductive paste including conductive compound containing silver powder and palladium powder as indispensable constituents, and rhodium powder and/or organic rhodium compound. These ingredients are distributed in vehicle. The object of the Disclosure is to provide a paste which is to be used for forming electrically conductive patterns on a fired veneer glass substrate or a fired glass ceramic substrate, and which shows a good wettability to solder and does not degrade adhesion between a conductive compound and a substrate. As later explained in detail, the paste suggested in the Disclosure contains rhodium, and hence, when the paste is used for forming internal electrodes of a laminated ceramic capacitor, a volume shrinkage thereof due to firing in a firing step is similar to that of a ceramic dielectric. As a result, it is expected to obtain an advantageous effect that it is possible to avoid an occurrence of a stress produced due to a difference in a volume shrinkage generated due to firing between internal electrodes and ceramic dielectrics.

However, even if either paste disclosed in the above mentioned two Disclosures is used, only one of the two factors, namely a bonding strength and a stress which cause a delamination of layers in a step of firing a laminated ceramic capacitor, can be improved, and hence it is impossible to sufficiently avoid a delamination of layers.

For instance, the electrically conductive paste disclosed in the first mentioned Disclosure can strengthen a bonding strength between ceramic dielectrics and internal electrodes, however, a stress may be larger than a bonding strength due to a difference in a volume shrinkage due to firing or a difference in a thermal expansion coefficient.

On the other hand, the electrically conductive paste disclosed in the second Disclosure can reduce a possibility of production of a stress due to a difference in a volume shrinkage due to firing. However, a bonding strength remains as it is, and hence if a stress produced due to a difference in a thermal expansion coefficient is larger than a bonding strength, there would occur a delamination of layers while a temperature is being lowered in a firing step, a local concentration of stress due to a dispersion in a bonding strength between an internal electrode and a ceramic dielectric, and a microcrack due to the local concentration of stress.

In addition, the electrically conductive paste disclosed in the first mentioned Disclosure has to be fired in a vacuum or an inert gas atmosphere. On the other hand, if lead system composite perovskite oxide used for a laminated ceramic capacitor to which the invention is directed is fired in a vacuum or in an inert gas atmosphere, the dielectric characteristic thereof is influenced by anoxia, and thereby a dielectric constant thereof is lowered. In conclusion, the electrically conductive paste disclosed in the first mentioned Disclosure is not practically applicable to the manufacturing of a laminated ceramic capacitor in which an electrically conductive paste and a ceramic dielectric have to be simultaneously fired.

SUMMARY OF THE INVENTION

It is an object of the present invention to provide a method of manufacturing a laminated ceramic capacitor having lead system composite perovskite oxide as a dielectric substance, using an electrically conductive paste which causes a greater bonding strength between a ceramic dielectric and an internal electrode than a conventional electrically conductive paste, and in addition suppresses an occurrence of a stress in a firing step.

The invention provides a method of manufacturing a laminated ceramic capacitor, including a step of forming an electrically conductive paste layer on a green sheet composed of lead system composite perovskite oxide. The paste contains a solvent in which are distributed metal powder including at least silver powder, organic titanium compound, organic rhodium compound and organic binder.

In a preferred embodiment, an amount of titanium in the paste is in the range of 0.02% to 0.09% by weight on the basis of a weight of the metal powder, and an amount of rhodium in the paste is in the range of 0.10% to 0.60% by weight on the basis of a weight of the metal powder.

In another preferred embodiment, the lead system composite perovskite oxide contains titanium and is represented by a chemical formula, $Pb(Mg_{1/2}W_{1/2})O_3$—$Pb(Ni_{1/3}Nb_{2/3})O_3$—$PbTiO_3$.

In still another preferred embodiment, the lead system composite perovskite oxide is represented by a chemical formula, $Pb(Fe, W)O_3$—$Pb(Fe, Nb)O_3$—$Pb(Zn, Nb)O_3$.

In yet another preferred embodiment, the organic titanium compound is titanium alcoholate.

In still yet another preferred embodiment, the organic titanium compound is chelate compound of titanium.

In further preferred embodiment, the organic rhodium compound is rhodium colophony salt.

In further preferred embodiment, the organic rhodium compound is rhodium alcoholate.

In further preferred embodiment, the organic titanium compound is titanate family coupling agent.

In further preferred embodiment, the organic rhodium compound is rhodium acetylacetone, $(CH_3COCHOCH_3)_3Rh$.

The advantages obtained by the aforementioned present invention will be described hereinbelow.

As mentioned earlier, a conventional electrically conductive paste used for the formation of internal electrodes of a laminated ceramic capacitor comprises metal powder including at least silver powder, distributed in vehicle including an organic binder and a solvent. On the other hand, the electrically conductive paste in accordance with the invention additionally contains organic titanium compound such as titanium alcoholate and chelate compound of titanium, and also contains organic rhodium compound such as rhodium colophony salt and rhodium alcoholate. These organic metal compounds operate as follows in a firing step.

In general, most of the metal powder contained in an electrically conductive paste is a mixture powder mainly including silver powder and additionally including palladium powder. The reason why the palladium is added is to change silver into silver-palladium alloy to thereby raise a fusing point of the paste. However, phenomena taken place in the paste such as a volume shrinkage due to sintering, formation of silver-palladium alloy, and diffusion of metal into ceramic are mainly influenced by behavior of sintered silver particles. As will be obvious from the following description, the operation of organic titanium compound and organic rhodium compound both contained in the electrically conductive paste in accordance with the invention, is not influenced by palladium. Hence, for the purpose of making it easy to understand the invention, an electrically conductive paste containing metal powder consisting of silver powder will be explained as an example. Hereinbelow, an electrically conductive paste comprising silver powder, an organic binder and a solvent is referred to as "a conventional electrically conductive paste" or simply "a conventional paste".

FIG. 1A is an enlarged schematic cross-sectional view of a laminated ceramic capacitor manufactured using a conventional paste additionally containing organic titanium compound. The organic titanium compound is decomposed in a binder-removing step and also in a firing step, thereby titanium being precipitated on surfaces of silver powders. The binder-removing step means a step in which organic binder contained in a laminated ceramic green sheet on which an electrically conductive paste is printed, is thermally decomposed to thereby be evapotranspired prior to a firing step. Then, the precipitated titanium cooperate with silver to form titanium-silver alloy 2 on a surface of an internal electrode 1. Since the titanium-silver alloy 2 combines with an uncertain amount of oxygen, oxides 4 present in ceramic 3 combine with the titanium-silver alloy 2 to thereby form silver-titanium oxides 5. (In this case, the oxide 4 is a lead oxide, and the oxide 4 includes a titanium oxide if the ceramic 3 contains titanium.) As a result, the ceramic 3 is strongly bonded to the internal electrode 1 with a high bonding strength through successive layers comprising the ceramic 3, the silver-titanium oxide 5, titanium-silver alloy 2 and the internal electrode 1. Consequently, the delamination of the ceramic from the internal electrode 1 would not occur.

FIG. 1B is an enlarged schematic cross-sectional view showing a sintered silver contained in a laminated ceramic capacitor manufactured using a conventional paste additionally including organic rhodium compound. As illustrated, the organic rhodium compound is decomposed in binder-removing and firing steps, and thus rhodium 6 is precipitated on a surface of the sintered silver 7. As understood from a phase diagram, rhodium has a quite small solid solution rate against silver and has a high fusing point. Accordingly, the rhodium 6 precipitated on a surface of the sintered silver 7 suppresses the diffusion of the silver into the ceramic 3, and also suppresses the growth of a silver powder to a particle. As a result, an electrically conductive paste containing organic rhodium compound therein can suppress a volume shrinkage of sintered silver during the formation of an internal electrode, and hence a difference in a volume shrinkage due to firing between the paste and the ceramic can be small, thereby a stress which would be generated due to the difference can be lowered or zeroed.

FIG. 2A is an enlarged schematic cross-sectional view illustrating sintered silver of a laminated ceramic capacitor manufactured using a conventional electrically conductive paste. In this case, it is impossible to suppress the growth of a silver powder into a particle, and hence a volume is greatly contracted due to firing. A volume shrinkage of an electrically conductive paste due to firing has conventionally been controlled by varying a diameter of the powders contained in the paste and/or varying an amount ratio of metal to vehicle. However, such a control entails problems. For instance, a quality of a screen-printing of the paste on a ceramic sheet is degraded. Namely, the aforementioned control may sacrifice other characteristics of the paste. On the other hand, the electrically conductive paste in accordance with the invention which contains organic rhodium compound therein provides an advantage that a volume shrinkage due to firing can be suppressed while not degrading a printing quality of the paste.

FIG. 2B is an enlarged schematic cross-sectional view of a laminated ceramic capacitor in which the delamination occurs between the ceramic 3 and the internal electrode 1. As mentioned earlier, the electrically conductive paste to which organic titanium compound is added forms the titanium-silver alloy 2 to thereby improve a bonding strength between the ceramic 3 and the internal electrode 1. However, in the paste to which only organic titanium compound is solely added, the ceramic 3 begins to contract in volume at a temperature lower than that at which the internal electrode 1 composed of silver begins to contract in volume. Consequently, due to a difference in a volume shrinkage due to firing between the ceramic 3 and the internal electrode 1, a plurality of gaps 8 are formed between the ceramic 3 and the internal electrode 1 prior to the formation of the titanium-silver alloy 2. As the sintering develops, the plurality of gaps 8 are enlarged and then are combined with each other into larger gaps. Since a volume shrinkage of the internal electrode 1 always develops earlier than a volume shrinkage of the ceramic 3, once produced, gaps 8 are never eliminated, and thus the ceramic 3 remains separated from the internal electrode 1.

On the other hand, the electrically conductive paste containing organic rhodium compound therein can suppress a volume shrinkage because of a presence of rhodium, and hence gaps 8 are not formed while a temperature is being raised in a firing step. However, considering a step in which a temperature is being lowered, a thermal expansion coefficient of metal is about ten times as great as that of ceramic, and hence a volume shrinkage of an internal electrode is larger than that of ceramic in a temperature lowering step. Thus, a stress is produced at an interface between ceramic and an internal electrode because of the difference in a volume shrinkage. As having been explained so far, in the paste which has an non-improved bonding strength with ceramic, such as a paste containing only organic rhodium compound, the gaps 8 are produced due to a difference in a volume shrinkage which is caused due to a difference in a thermal expansion coefficient in a temperature lowering step, and the gaps 8 tend to cause a delamination between the ceramic and the internal electrode.

On the other hand, the electrically conductive paste in accordance with the invention which contains organic titanium compound and organic rhodium compound therein can avoid the production of the gaps 8 in a temperature raising step due to the presence of rhodium which can suppress a volume shrinkage of rhodium due to firing. In the temperature raising step, titanium is precipitated on a surface of an internal electrode to form titanium-silver alloy. Since a solid diffusion speed between silver and titanium oxide is slower than that between silver and silver and that between silver and palladium in the case that the paste contains palladium therein, the added organic titanium compound does not cause a sintering temperature of an internal electrode to lower, and hence an effect caused by rhodium is that a volume shrinkage due to firing is suppressed is not deteriorated.

In addition, in a temperature lowering step, a chemical bonding structure comprising the ceramic 3, the silver-titanium oxide 5, the titanium-silver alloy 2 and the internal electrode 1, formed between the ceramic 3 and the internal electrode 1, causes the gaps 8, which would be produced due to a difference in a volume shrinkage which in turn is caused by a difference in a thermal expansion coefficient, not to be produced. Since rhodium is dissolved into silver by quite a small amount, the added rhodium does not influence the formation of titanium-silver alloy and silver-titanium oxide.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

Figure 1A:
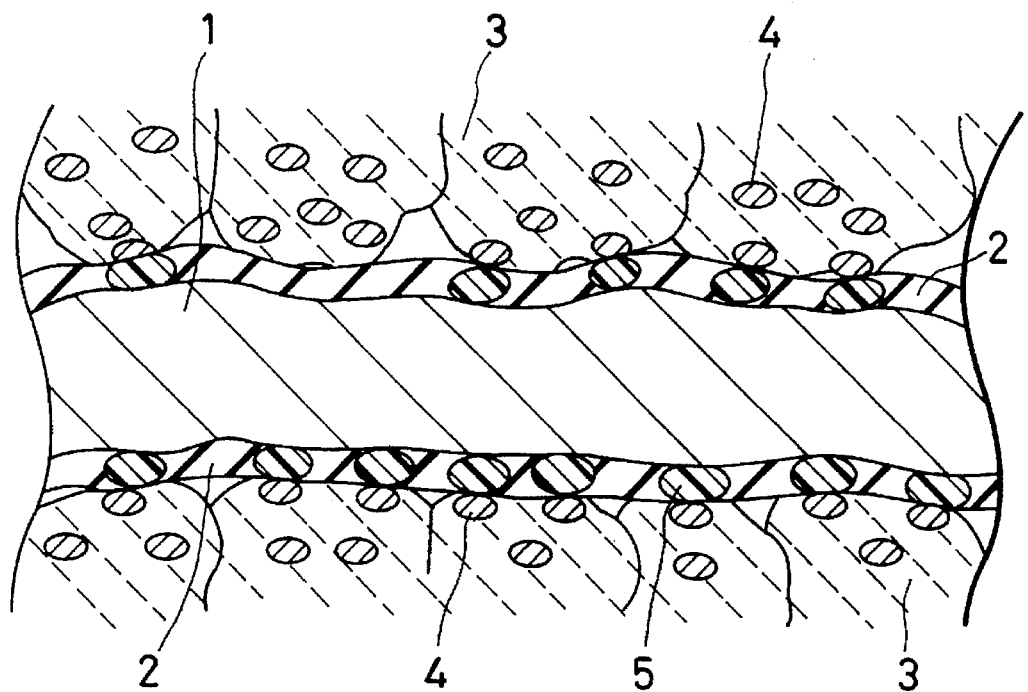
FIG. 1A is an enlarged schematic cross-sectional view of a laminated ceramic capacitor manufactured using a conventional paste additionally containing organic titanium compound.
Figure 1B:
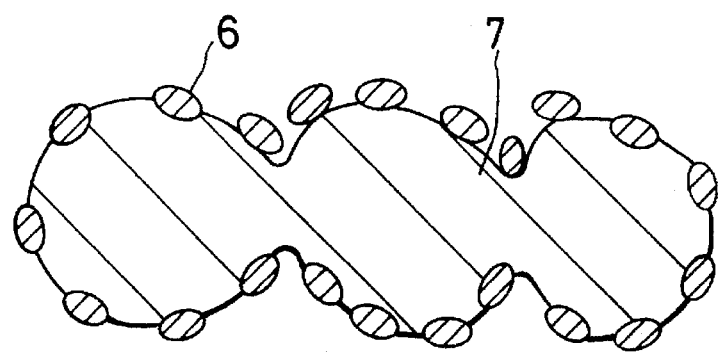
FIG. 1B is an enlarged schematic cross-sectional view showing a sintered silver contained in a laminated ceramic capacitor manufactured using a conventional paste additionally including organic rhodium compound.
Figure 2A:
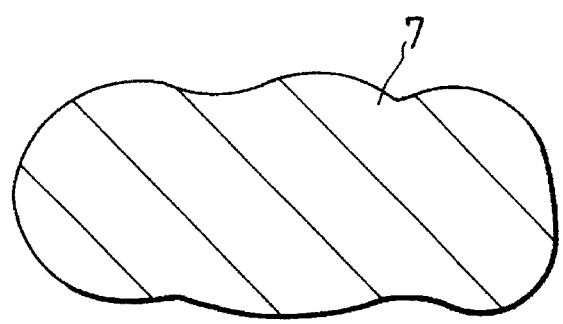
FIG. 2A is an enlarged schematic cross-sectional view illustrating sintered silver of a laminated ceramic capacitor manufactured using a conventional electrically conductive paste.
Figure 2B:
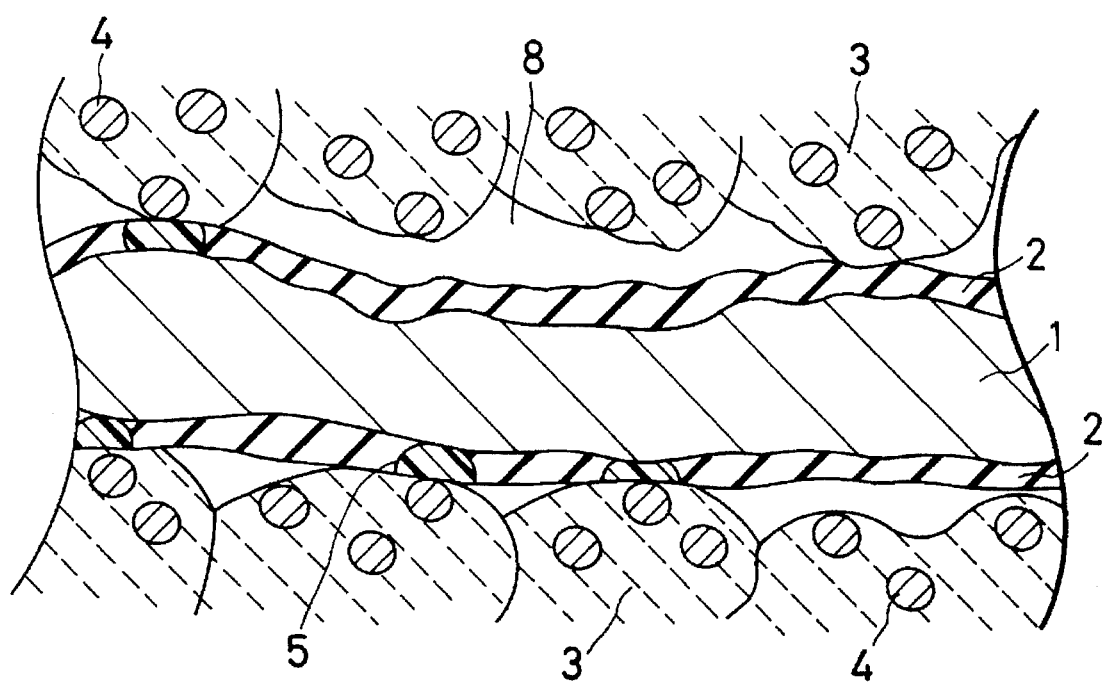
FIG. 2B is an enlarged schematic cross-sectional view of a laminated ceramic capacitor in which a delamination occurs between ceramic and an internal electrode.

A preferred embodiment in accordance with the present invention will be explained hereinbelow.

Tables 1 and 2 show a composition of electrically conductive pastes used for a laminated ceramic capacitor in accordance with the invention. The metal powder contained in the paste is a mixture powder including silver by 70% and palladium by 30%. The silver powder has a diameter in the range of 0.2 to 0.5 micrometers, and the palladium powder has a diameter in the range of 0.1 to 0.3 micrometers.

TABLE 1

COMPOSITION OF PASTES (Weight Ratio)

| Constituent of Paste | Pas. 1 | Pas. 2 | Pas. 3 | Pas. 4 | Pas. 5 | Pas. 6 | Pas. 7 | Pas. 8 |
|---|---|---|---|---|---|---|---|---|
| Metal Powder | 100 | 100 | 100 | 100 | 100 | 100 | 100 | 100 |
| Content of Ti | 0.01 | 0.02 | 0.02 | 0.02 | 0.02 | 0.09 | 0.09 | 0.09 |
| Content of Rh | 0 | 0.05 | 0.10 | 0.20 | 0.60 | 0.60 | 0.60 | 0.65 |
| Content of Organic | 66 | 66 | 66 | 66 | 66 | 66 | 66 | 66 |

TABLE 2

COMPOSITION OF PASTES (Weight Ratio)

| Constituent of Paste | Pas. 9 | Pas. 10 | Pas. 11 | Pas. 12 | Pas. 13 | Pas. 14 | Pas. 15 | Pas. 16 |
|---|---|---|---|---|---|---|---|---|
| Metal Powder | 100 | 100 | 100 | 100 | 100 | 100 | 100 | 100 |
| Content of Ti | 0.09 | 0.09 | 0.09 | 0.09 | 0.09 | 0.10 | 0.10 | 0 |
| Content of Rh | 0 | 0.05 | 0.10 | 0.20 | 0.60 | 0.10 | 0.60 | 0 |
| Content of Organic | 66 | 66 | 66 | 66 | 66 | 66 | 66 | 66 |

As the organic titanium compound, a titanate family coupling agent commercially available from Ajinomoto Kabushikikaisha under the trade name of "Blenact", is used and as the organic rhodium compound a rhodium acetylacetone, $(CH_3COCHOCH_3)_3Rh$, commercially available from Wako Junyaku Kogyo Kabushikikaisha is used.

The ceramic dielectric substance used in the embodiment is lead system composite perovskite oxide dielectric substance represented by a chemical formula, $Pb(Mg_{1/2}W_{1/2})O_3$—$Pb(Ni_{1/3}Nb_{2/3})O_3$—$PbTiO_3$.

In the embodiment, silver powder was in advance mixed with palladium powder so that each constituted 70% and 30%, to thereby prepare silver-palladium mixture powder.

Then, organic titanium compound and organic rhodium compound were mixed with vehicle. To this mixture was added the silver-palladium mixture powder. The resultant mixture was well mixed with three rolls, and electrically conductive pastes Nos. 1 to 16 were obtained as shown in Tables 1 and 2.

A green sheet having a thickness of 10 micrometers was manufactured from the aforementioned lead system composite perovskite oxide. On the green sheet were screen-printed predetermined patterns using each of the pastes Nos. 1 to 16. Sixty pastes were laminated and compressed to bond with each other, and then the laminated structure was cut into an unfired laminated ceramic capacitor.

Then, after the unfired laminated ceramic capacitor was subjected to a heat treatment to thereby decompose binder contained therein, the unfired ceramic capacitor was fired to thereby obtain a laminated ceramic capacitor. The firing was carried out under the condition that a temperature was raised at a speed of 100 degrees centigrade per hour, a temperature of 1000 degrees centigrade was maintained for 4 hours, and a temperature was lowered at a speed of 100 degrees centigrade per hour. The firing atmosphere was air.

All of the laminated ceramic capacitors made from each constituent of the paste were inspected for a number of delaminations between a ceramic dielectric and an internal electrode, and also with respect to a number of cracks produced in the ceramic dielectric. The reliability test was also carried out. The test of the numbers of delaminations and cracks was carried out for over 100,000 capacitors for each constituent. The reliability test was a humidity test under the conditions that a temperature was 85 degrees centigrade, a humidity was 85% RH, an applied voltage was 25 DCV, and the number of samples was 500 for each constituent. A number of defects after 1000 hours has passed was counted.

Tables 3 and 4 shows the results of the tests. As understood from the Tables 3 and 4, a laminated ceramic capacitor manufactured from an electrically conductive paste containing titanium in the range of 0.02% to 0.09% by weight on the basis of a weight of the metal powder, and rhodium in the range of 0.10% to 0.60% by weight on the basis of a weight of the metal powder, showed that no delaminations and cracks occurred, and that no defects were found in the reliability test. Thus, the advantageous effects of the invention were confirmed.

TABLE 3

| | NUMBER OF DEFECTIVES | | | | | | | |
|---|---|---|---|---|---|---|---|---|
| Constituent of Paste | Pas. 1 | Pas. 2 | Pas. 3 | Pas. 4 | Pas. 5 | Pas. 6 | Pas. 7 | Pas. 8 |
| Number of Delaminations | 32 | 12 | 0 | 0 | 0 | 0 | 0 | 0 |

TABLE 3-continued

| Constituent of Paste | NUMBER OF DEFECTIVES | | | | | | | |
|---|---|---|---|---|---|---|---|---|
| | Pas. 1 | Pas. 2 | Pas. 3 | Pas. 4 | Pas. 5 | Pas. 6 | Pas. 7 | Pas. 8 |
| Number of Cracks | 4 | 2 | 0 | 0 | 0 | 0 | 0 | 1 |
| Defectives by Humidity Test | 30 | 8 | 0 | 0 | 0 | 0 | 0 | 0 |

TABLE 4

| Constituent of Paste | NUMBER OF DEFECTIVES | | | | | | | |
|---|---|---|---|---|---|---|---|---|
| | Pas. 9 | Pas. 10 | Pas. 11 | Pas. 12 | Pas. 13 | Pas. 14 | Pas. 15 | Pas. 16 |
| Number of Delaminations | 12 | 8 | 0 | 0 | 0 | 1 | 0 | 20 |
| Number of Cracks | 4 | 0 | 0 | 0 | 0 | 0 | 8 | 3 |
| Defectives by Humidity Test | 25 | 12 | 0 | 0 | 0 | 0 | 8 | 8 |

In the embodiment, the invention is applied to a laminated ceramic capacitor having lead system composite perovskite oxide including titanium as a dielectric substance. However, the same results as those of the preferred embodiment were obtained with respect to a laminated ceramic capacitor having lead system perovskite oxide not including titanium, $Pb(Fe, W)O_3$—$Pb(Fe, Nb)O_3$—$Pb(Zn, Nb)O_3$, as a dielectric substance.

As having been described so far, the method in accordance with the invention uses an electrically conductive paste featured by containing organic titanium compound and organic rhodium compound.

Due to this feature, the invention can enhance a bonding strength between a ceramic dielectric and an internal electrode in the formation of a laminated ceramic capacitor, and in addition reduce or zero a stress which would be produced due to a difference in a volume shrinkage which is caused by a difference in a thermal expansion coefficient. In addition, the electrically conductive paste used for reducing the invention to practice does not have to be fired in a vacuum or in an inert gas atmosphere, but can be fired under a presence of oxygen, namely in an air. Accordingly, the invention is applicable to a laminated ceramic capacitor using a ceramic, as a dielectric substance, a dielectric characteristic of which is influenced by oxygen present in a firing atmosphere.

Thus, the method in accordance with the invention provides a laminated ceramic capacitor in which a delamination between a ceramic dielectric and an internal electrode would not occur in a firing step and which exhibit highly reliable electrical characteristics.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed is:

1. A method of manufacturing a laminated ceramic capacitor, said method comprising the steps of;

making an unfired laminated ceramic capacitor by forming an electrically conductive paste layer on a green sheet composed of lead system composite perovskite oxide, said paste comprising a solvent in which there are distributed a metal powder including at least silver powder, an organic titanium compound which is one selected from the group consisting of titanium alcoholate and titanate family coupling agent, an organic rhodium compound, and an organic binder, and an amount of titanium in said paste being in the range of 0.02% to 0.09% by weight on the basis of a weight of said metal powder, and wherein an amount of rhodium in said paste being in the range of 0.10% to 0.60% by weight on the basis of a weight of said metal powder; and firing said unfired laminated ceramic capacitor.

2. The method in accordance with claim 1, wherein said lead system composite perovskite oxide contains titanium and is represented by a chemical formula, $Pb(Mg_{1/2}W_{1/2})O_3$—$Pb(Ni_{1/3}Nb_{2/3})O_3$—$PbTiO_3$.

3. The method in accordance with claim 1, wherein said lead system composite perovskite oxide is represented by a chemical formula, $Pb(Fe, W)O_3$—$Pb(Fe, Nb)O_3$——$Pb(Zn, Nb)O_3$.

4. The method in accordance with claim 1, wherein said organic rhodium compound is rhodium colophony salt.

5. The method in accordance with claim 1, wherein said organic rhodium compound is rhodium alcoholate.

6. The method in accordance with claim 1, wherein said organic rhodium compound is rhodium acetylacetone, $(CH_3COCHOCH_3)_3Rh$.

7. A method of manufacturing a laminated ceramic capacitor, said method comprising the steps of:

making an unfired laminated ceramic capacitor by forming an electrically conductive paste layer on a green sheet composed of lead system composite perovskite oxide which contains titanium and is represented by a chemical formula, $Pb(Mg_{1/2}W_{1/2})O_3$—$Pb(Ni_{1/3}Nb_{2/3})O_3$—$PbTiO_3$, said paste comprising a solvent in which there is distributed a metal powder including at least silver powder, an organic titanium compound which is chelate compound of titanium, an organic rhodium compound which is one selected from the group consisting of rhodium colophny salt, rhodium alcoholate and rhodium acetylacetone, $(CH_3COCHOCH_3)_3Rh$, and an organic binder, an amount of titanium in said paste is in the range of 0.02% to 0.09% by weight on the basis of a weight of said metal powder, and an amount of rhodium in said paste is in the range of 0.10% to 0.60% by weight on the basis of a weight of said metal powder; and firing said unfired laminated ceramic capacitor.

8. A method of manufacturing a laminated ceramic capacitor, said method comprising the steps of;

making an unfired laminated ceramic capacitor by forming an electrically conductive paste layer on a green sheet composed of lead system composite perovskite oxide which contains titanium and is represented by a chemical formula, $Pb(Mg_{1/2}W_{1/2})O_3$—$Pb(Ni_{1/3}Nb_{2/3})O_3$—$PbTiO_3$, said paste comprising a solvent in which there are distributed a metal powder including at least silver powder, an organic titanium compound which is a chelate compound of titanium, an organic rhodium compound which is rhodium acetylacetone, $(CH_3COCHOCH_3)_3Rh$ and an organic binder, and an amount of titanium in said paste being in the range of 0.02% to 0.09% by weight on the basis of a weight of said metal powder, and an amount of rhodium in said paste being in the range of 0.10% to 0.60% by weight on the basis of a weight of said metal powder; and firing said unfired laminated ceramic capacitor.

9. A method of manufacturing a laminated ceramic capacitor, said method comprising the steps of;

making an unfired laminated ceramic capacitor by forming an electrically conductive paste layer on a green sheet composed of lead system composite perovskite oxide which contains titanium and is represented by a chemical formula, $Pb(Fe, W)O_3$—$Pb(Fe, Nb)O_3$—$Pb(Zn, Nb)O_3$, said paste comprising a solvent in which there are distributed a metal powder including at least silver powder, an organic titanium compound which is a chelate compound of titanium, an organic rhodium compound which is rhodium acetylacetone, $(CH_3COCHOCH_3)_3Rh$ and organic binder, and an amount of titanium in said paste being in the range of 0.02% to 0.09% by weight on the basis of a weight of said metal powder, and an amount of rhodium in said paste being in the range of 0.10% to 0.60% by weight on the basis of a weight of said metal powder; and firing said unfired laminated ceramic capacitor.

\* \* \* \* \*